Patented Mar. 21, 1950

2,500,961

UNITED STATES PATENT OFFICE 2,500,961

METHOD OF PRODUCTION OF DDT

Walter H. C. Rueggeberg and Walter A. Cook,
United States Army

No Drawing. Application November 20, 1944,
Serial No. 564,300

7 Claims. (Cl. 260—649)

(Granted under the act of March 3, 1883, as
amended April 30, 1928; 370 O. G. 757)

The invention described herein may be manufactured and used by or for the government for governmental purposes without the payment to us of any royalty thereon.

This invention relates, generally, to condensation type reactions wherein aryl compounds are condensed with aldehydes, and relates, particularly, to a new and improved method of producing DDT [2, 2-bis (p-chlorophenyl) 1,1,1-trichlorethane].

DDT has been found to be an excellent insecticide and has been widely used by military forces in jungle theatres and in the tropics. To date, the production of DDT, (2,2-bis(p-chlorphenyl) 1,1,1-trichloroethane) depends upon the employment of large volumes of 98% $H_2SO_4$ in order to effect the condensation between anhydrous chloral ($CCl_3CHO$) and chlorbenzene ($C_6H_5Cl$). The chemical literature contains several references to condensations of this type where some aryl compound is condensed with an aldehyde to form 1,1 diarylethanes. Thus, for example, Baeyer (Ber. 7, 1190 (1873)) succeeded in condensing acetaldehyde ($CH_3CHO$) with benzene to form 1,1 diphenylethane, using, however, 600 grams of concentrated $H_2SO_4$ for every 0.06 mols of paraldehyde (($CH_3CHO$)$_3$). This type of condensation conducted in the presence of a large excess of concentrated $H_2SO_4$ is still being conducted today, specifically in the synthesis of DDT.

The object of this invention, generally stated, is the provision of an improved method of carrying out condensation type reactions between aryl compounds and aldehydes.

Specifically, the object of this invention is the provision of a new and improved method of producing DDT [2,2-bis (p-chlorophenyl) 1,1,1-trichlorethane] characterized in being more efficient and cheaper, than present methods of making DDT. The superiority of the method of making DDT according to this invention is, in part, due to the elimination of the use of the large volumes of concentrated sulphuric acid heretofore required, and the utilization of small quantities of chlorsulfonic acid in place thereof.

Other objects of the invention will, in part, be obvious, and will, in part, appear hereinafter.

For a more complete understanding of the nature and scope of this invention, reference may be had to the following detailed description thereof, wherein a presently preferred embodiment of practicing the invention is fully described.

Numerous experiments have led to the conclusion that the role played by $H_2SO_4$ in the DDT synthesis is one of specific catalysis rather than one of simple dehydration. The mechanism for the action of $H_2SO_4$ appears to be as follows:

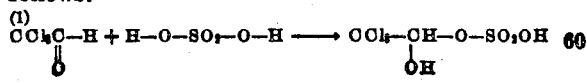

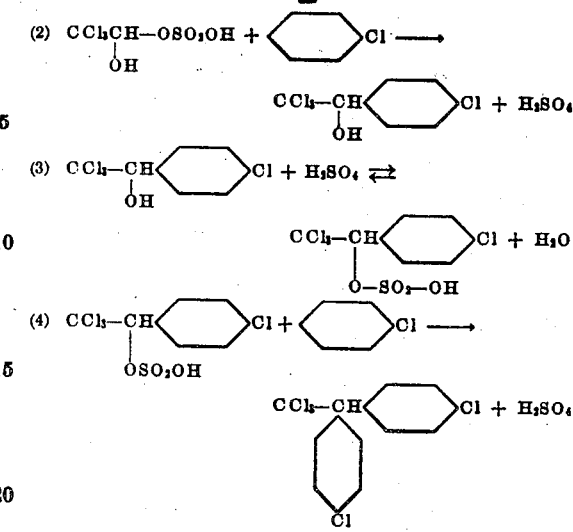

Reaction 3, above, for two reasons, is believed to be responsible for the necessity of using large quantities of concentrated $H_2SO_4$. First, a huge excess of concentrated $H_2SO_4$ nullifies the dilution effect of the acid by the water formed and second, the reversibility of Equation 3 is minimized by the removal of $H_2O$ through a large excess of concentrated $H_2SO_4$.

These difficulties have been overcome by the use of chlorsulfonic acid, ($ClSO_3H$ a commercial product) as condensing agent for chloral hydrate and chlorbenzene to form DDT. An added advantage in the use of chlorsulfonic acid is the fact that chloral hydrate ($CCl_3$—$CH(OH)_2$, a commercial product) may be used as reagent in place of chloral, ($CCl_3CHO$, not a commercial product) which would have to be prepared separately from chloral hydrate by the required quantity of concentrated $H_2SO_4$ in excess of that required for the $H_2SO_4$ in the DDT condensation, described above.

The action of chlorsulfonic acid is described in the following set of equations:

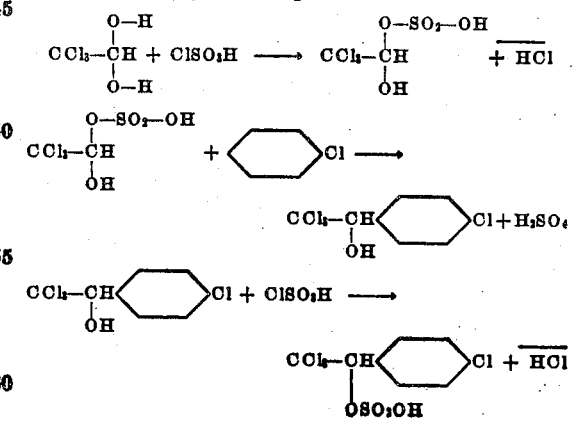

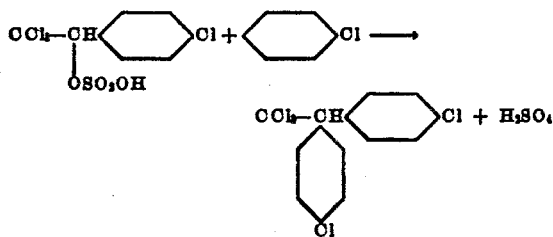

As exemplified by these reactions, the quantities of acid used are metathetical, there is no elimination of water, as such, and the reaction proceeds by the evolution of gaseous HCl and the formation of anhydrous $H_2SO_4$.

A presently preferred method of carrying out the invention in the production of DDT is as follows:

82.7 parts by weight of chloral hydrate are placed in a suitable reaction vessel provided with thermometer, stirrer, dropping funnel, and gas outlet tube. From the dropping funnel, 58.3 parts by weight of commercial chlorsulfonic acid are added slowly, keeping the temperature between 0° C. and 10° C. and avoiding a too violent evolution of HCl gas. After the addition of chlorsulfonic acid is complete, the mixture is allowed to stir at 10–20° C. until all of the chloral hydrate crystals have dissolved. 112.6 parts by weight of chlorbenzene are added to the reaction vessel at a rate slow enough so the reaction mixture remains at 20° C. This addition requires about 5–10 minutes. An additional 58.3 parts by weight of chlorsulfonic acid are then added dropwise from the dropping funnel over a period of approximately 2 hours, at which time a heavy precipitation of the DDT has become visible. Stirring is continued for an additional 3–5 hours. When the reaction is complete, 200 parts by weight of an ice-$H_2O$ mixture is added and the product filtered off on a Buchner funnel. Air is allowed to draw through the funnel for an additional 12 hours. Yield, crude DDT=94.5 g. (53% of theory) M. P. 95–98° C., 102–103° C., depending upon the extent of the water wash and time of drying. Upon recrystallization from ethanol, a product melting at 107–108° C. is obtained.

*Analysis*

|  | Calculated | Found |
|---|---|---|
| Percent C | 47.45 | 47.51 |
| Percent H | 2.56 | 2.68 |
| Percent Cl | 49.99 | 49.53 |

Since recrystallization from ethanol results in the loss of approximately 35% of the product, to the mother liquor, the crude DDT may instead be further purified by washing with a 1% aqueous solution of a wetting agent (such as Aerosol OT or Tergitol 4 or 7).

By steam distilling the oily layer of the filtrate, mentioned above, an additional 10–15% of DDT may be recovered from the residue thus bringing the total yield to 63–68%.

This invention may also be carried out at temperatures less than or greater than the 10–20° C. temperature range set forth in the presently preferred method. For example, temperatures varying between —5° C. and 39° C. yielded the following results:

| Solvent | Temperature | Reaction Time | Yield |
|---|---|---|---|
|  | °C. | hr. | Percent |
| $CCl_4$ | —5 to 0 | 5 | 38–40 |
| none | 10 | 2 | 40.2 |
| Do | 10 | 6 | 57.5 |
| Do | 20 | 6 | 69.1 |
| Do | 30 | 6 | 74.0 |
| $CCl_4$ | 39 | 5 | 42.0 |

It is believed that this invention may be conducted at any temperature from 0° C. or lower and 50° C. or higher, the higher temperatures, however, being detrimental to the purity of the product.

The advantages of this invention are not confined to completely eliminating the use of sulfuric acid, and it is possible through this invention to effect the condensation between chloralhydrate and chlorobenzene by employing a mixture of chlorosulfonic acid and sulfuric acid or chlorosulfonic acid and fuming sulfuric acid (oleum) as illustrated by the following example: 82.7 parts by weight of chloralhydrate is placed in a suitable reactor equipped with stirrer, thermometer, gas exit tube, and dropping funnel. 58.3 parts by weight of chlorsulfonic acid is added with stirring at such a rate that the temperature of the reaction mixture does not exceed 10° C. When all the chloralhydrate crystals have dissolved and the evolution of HCl gas has virtually ceased, 112.5 parts by weight of chlorbenzene is added with stirring to the reaction mixture at a rate such that the temperature does not exceed 20° C. From the dropping funnel, 143.0 parts by weight of 28% oleum ($H_2SO_4.SO_3$) is added dropwise with vigorous stirring over a period of 10–30 minutes. Stirring is continued from 2–6 hours at 20° C. after the addition of the oleum is complete. The product is washed with water, filtered, and dried. Yield DDT=50–60% of theory.

Although from the cost standpoint, it is now preferred to use chloralhydrate instead of anhydrous chloral, through the use of chlorsulfonic acid, this invention also lends itself to the condensation of anhydrous chloral ($CCl_3CHO$) with chlorbenzene. This reaction, also requires the metathetical quantity of chlorsulfonic acid, being, however, only one-half that required for an equivalent quantity of chloral hydrate. The course of this reaction is believed to be only slightly different from the mechanism proposed for the chloralhydrate process. The condensation of chloral with chlorbenzene in the presence of chlorsulfonic acid is believed to be representable by the following set of equations:

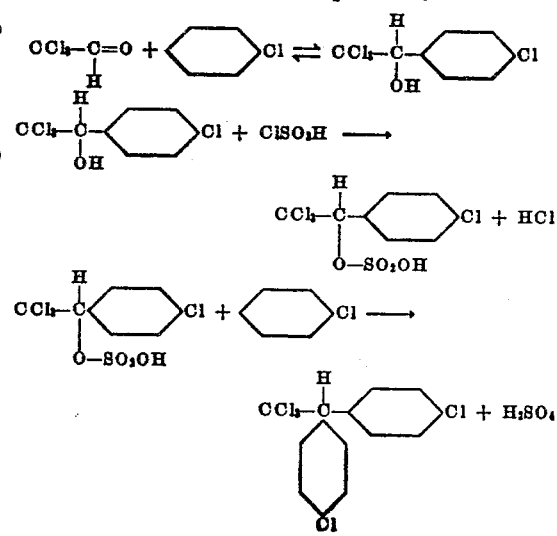

The following example illustrates the use of anhydrous chloral: 73.7 parts by weight of anhydrous chloral is mixed with 112.5 parts by weight of chlorbenzene at 10° C. in a suitable reaction vessel equipped with thermometer, stirrer, gas exit tube, and dropping funnel. From the dropping funnel 58.3 parts by weight of chlorsulfonic acid is added dropwise over a period of 30 minutes keeping the temperature at 10-20° C. After addition of the chlorsulfonic acid is complete, stirring is allowed to continue for an additional 5½ hours at 10-20° C. The product is washed 3 times with water, filtered, dried, and weighed. Yield DDT=50-60% of theory.

This invention is believed to be applicable to any aromatic hydrocarbon and aliphatic or aromatic aldehyde, ordinarily undergoing the type of condensation under consideration, and may be conducted as described or in the presence of an inert solvent, such as carbon tetrachloride.

The general applicability of chlorsulfonic acid as an agent for condensing aromatic hydrocarbons with chloralhydrate or chloral is shown by the following examples: 8.2 parts by weight of chloralhydrate (1 mol part) is allowed to react at 0-10° C. with 2.9 parts by weight of chlorsulfonic acid (1 mol part) with agitation. 2 mol parts of the appropriate hydrocarbon are added to this reaction mixture keeping the temperature at 20° C. or below throughout the addition. An additional 2.9 parts by weight of chlorsulfonic acid (1 mol part) are brought into the reaction mixture at a rate such that the temperature does not exceed 20° C. Agitation, supplied either by stirring or shaking is continued for 1-5 hours. The crude product is filtered off, washed twice with water and recrystallized from ethanol. The results are summarized in the following table:

*Condensation products obtained by the action of chlorsulfonic acid on chloralhydrate and aromatic hydrocarbons*

| Aromatic Hydrocarbon used | Product obtained | Melting Point, °C. | Per Cent C | Per Cent H | Per Cent Cl | Per Cent Br |
|---|---|---|---|---|---|---|
| Benzene 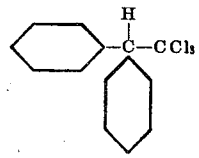 | 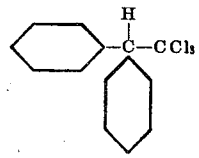 | 61-62 | found 59.0 theory 58.9 | found 3.9 theory 4.0 | found 37.2 theory 37.3 | |
| Toluene | | 74-76 | found 61.2 theory 61.3 | found 4.8 theory 4.8 | found 34.8 theory 33.9 | |
| Brombenzene | | 138-139 | found 38.2 theory 37.9 | found 2.2 theory 2.1 | found 22.80 theory 24.0 | Found 35.99 theory 36.0 |
| p-dibrombenzene | | heavy oil | | not analyzed | | |
| O-dichlorbenzene | | heavy oil (?) | | not analyzed | | |

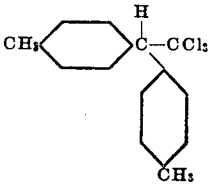
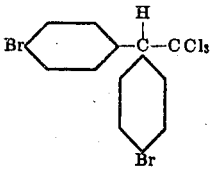
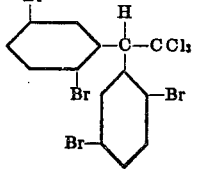
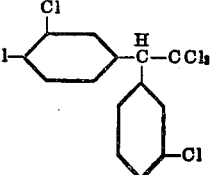

Since other changes may be made in the foregoing processes and procedures, and different embodiments of the invention will suggest themselves to those skilled in the art, it is intended that all matter described above be taken as illustrative and not in a limiting sense.

We claim:

1. In the reaction of the member of the group consisting of anhydrous chloral and chloral hydrate with two mols of chloral benzene to form 2,2 - bis(p - chlorophenyl) 1,1,1 - trichloroethane, the improvement which consists in carrying out the reaction in the presence of a stoichiometric amount of chlorosulfonic acid.

2. The method of making 2,2-bis (p-chlorphenyl) 1,1,1-trichloroethane, which comprises, adding about 1 part by weight of chlorsulfonic acid to about 1.42 parts by weight of chloralhydrate while keeping the reaction temperature between about 0° C. to 10° C., stirring the reaction mass until all of the chloralhydrate crystals have dissolved, adding about 1.93 parts by weight of chlorbenzene to the reaction mass while maintaining the temperature at about 20° C., adding about 1 part by weight of chlorsulfonic acid to the reaction mass and separating the yield of 2,2-bis (p-chlorphenyl) 1,1,1-trichloroethane from the reaction mass.

3. The method of making 2,2-bis (p-chlorphenyl) 1,1,1-trichloroethane, which comprises, adding about 1 part by weight of chlorsulfonic acid to about 1.42 parts by weight of chloralhydrate while keeping the reaction temperature between about 0° C. to 10° C., after all the chloralhydrate crystals have dissolved and the evolution of HCl gas has substantially ceased adding about 1.93 parts by weight of chlorbenzene to the reaction mass while maintaining the temperature of the mass not in excess of about 20° C., slowly adding about 2.45 parts by weight of 28% oleum ($H_2SO_4.SO_3$) with vigorous stirring, stirring the reaction mass from 2 to 6 hours at about 20° C. after addition of said oleum, and separating the yield of 2,2-bis (p-chlorphenyl) 1,1,1-trichloroethane from the reaction mass.

4. The method of making 2,2-bis (p-chlorphenyl) 1,1,1-trichloroethane, which comprises, mixing about 1.26 parts by weight of anhydrous chloral with about 1.93 parts by weight of chlorbenzene at about 10° C., adding about 1 part by weight of chlorsulfonic acid to the reaction mass while maintaining the temperature thereof between about 10–20° C., stirring the reaction mass during the addition of the chlorsulfonic acid and for a substantial period after the addition, and separating the yield of 2,2-bis (p-chlorphenyl) 1,1,1-trichloroethane from the reaction mass.

5. The method of making 2,2-bis (p-chlorphenyl) 1,1,1-trichloroethane which comprises reacting chlorosulfonic acid, chlorobenzene, and chloral hydrate together by slowly adding chlorosulfonic acid to chloral hydrate crystals while stirring the mixture and maintaining its temperature within a range of between minus 50° C. and plus 39° C. until the crystals have become dissolved in and hydrochloric acid has been evolved from the mixture, adding chlorobenzene to the solution thus formed at a rate adapted to maintain the solution at a temperature of about 20° C. while the liquid is being stirred then adding additional chlorosulfonic acid to the solution until $H_2SO_4$ is produced and 2,2-bis (p-chlorphenyl) 1,1,1-trichloroethane commences to precipitate from the solution, stirring said mixture until the reaction is substantially complete, thereafter separating the precipitated 2,2-bis (p-chlorphenyl) 1,1,1-trichloroethane from the mixture, the chlorobenzene and chloral hydrate being in the mol ratio of 2:1.

6. The method of making 2,2-bis-(p-chlorphenyl) 1,1,1-trichloroethane, said method consisting of slowly adding chlorosulfonic acid to chloral hydrate crystals until said crystals have been dissolved by the chlorosulfonic acid, slowly adding chlorobenzene to the solution thus formed until said 2,2-bis (p-chlorphenyl) 1,1,1-trichloroethane commences to precipitate visibly from said solution, then slowly adding to the precipitating solution more chlorosulfonic acid until there is a heavy precipitation of said 2,2-bis (p-chlorphenyl) 1,1,1-trichloroethane and finally separating said 2,2-bis (p-chlorphenyl) 1,1,1-trichloroethane from said solution, the chlorobenzene and chloral hydrate being in the mol ratio of 2:1.

7. The method of claim 6, in which said mixture and solution are stirred and maintained at a temperature of between minus 50° C. and plus 39° C., until the 2,2-bis (p-chlorphenyl) 1,1,1-trichloroethane is heavily precipitated.

WALTER H. C. RUEGGEBERG.
WALTER A. COOK.

REFERENCES CITED

The following references are of record in the file of this patent:

UNITED STATES PATENTS

| Number | Name | Date |
|---|---|---|
| 2,054,140 | Segessemann | Sept. 15, 1936 |
| 2,259,723 | Ballard et al. | Oct. 21, 1941 |
| 2,329,074 | Muller | Sept. 7, 1943 |
| 2,349,211 | Tulleners | May 16, 1944 |